March 10, 1970     E. FLOYD, JR     3,500,264
CONNECTION MEANS FOR WAVEGUIDE MEANS
Filed Nov. 8, 1966     10 Sheets-Sheet 2
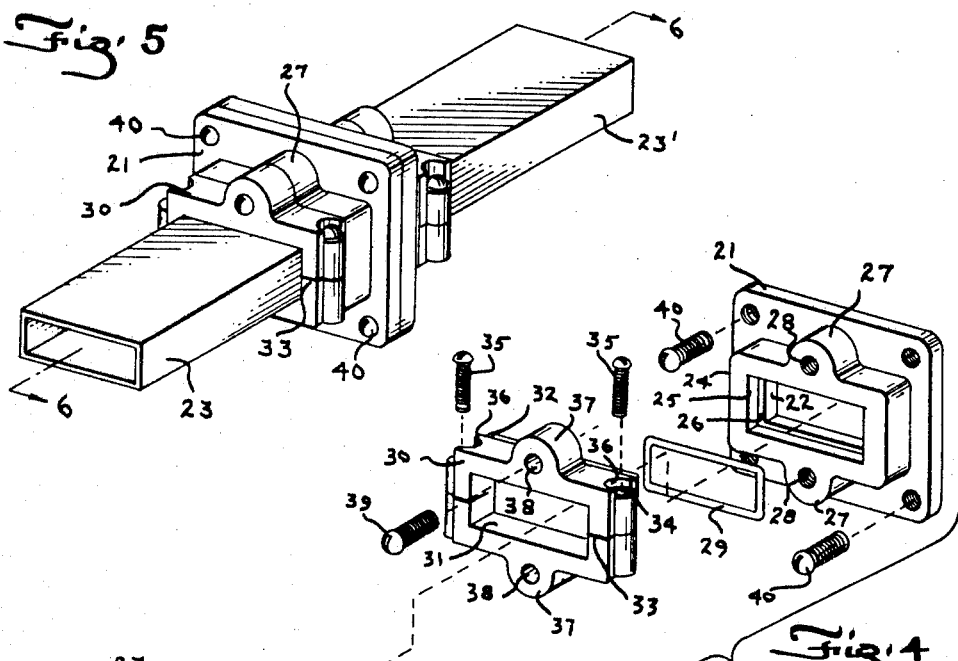
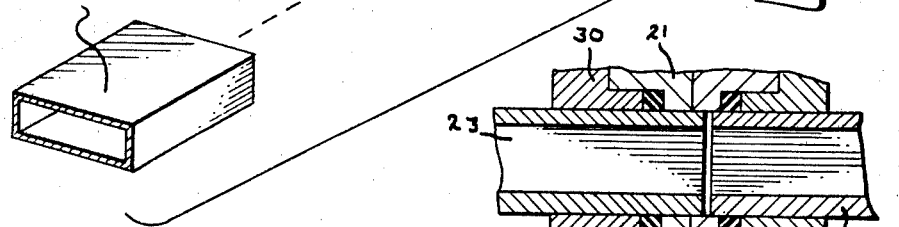
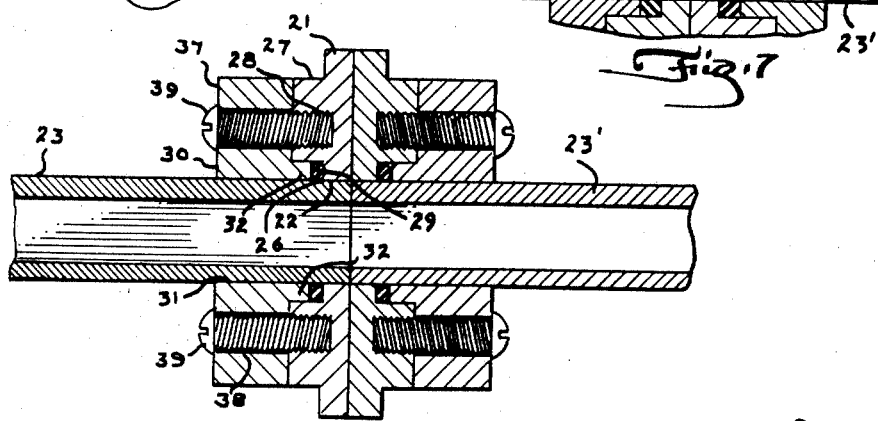
Inventor
EDWIN FLOYD JR.

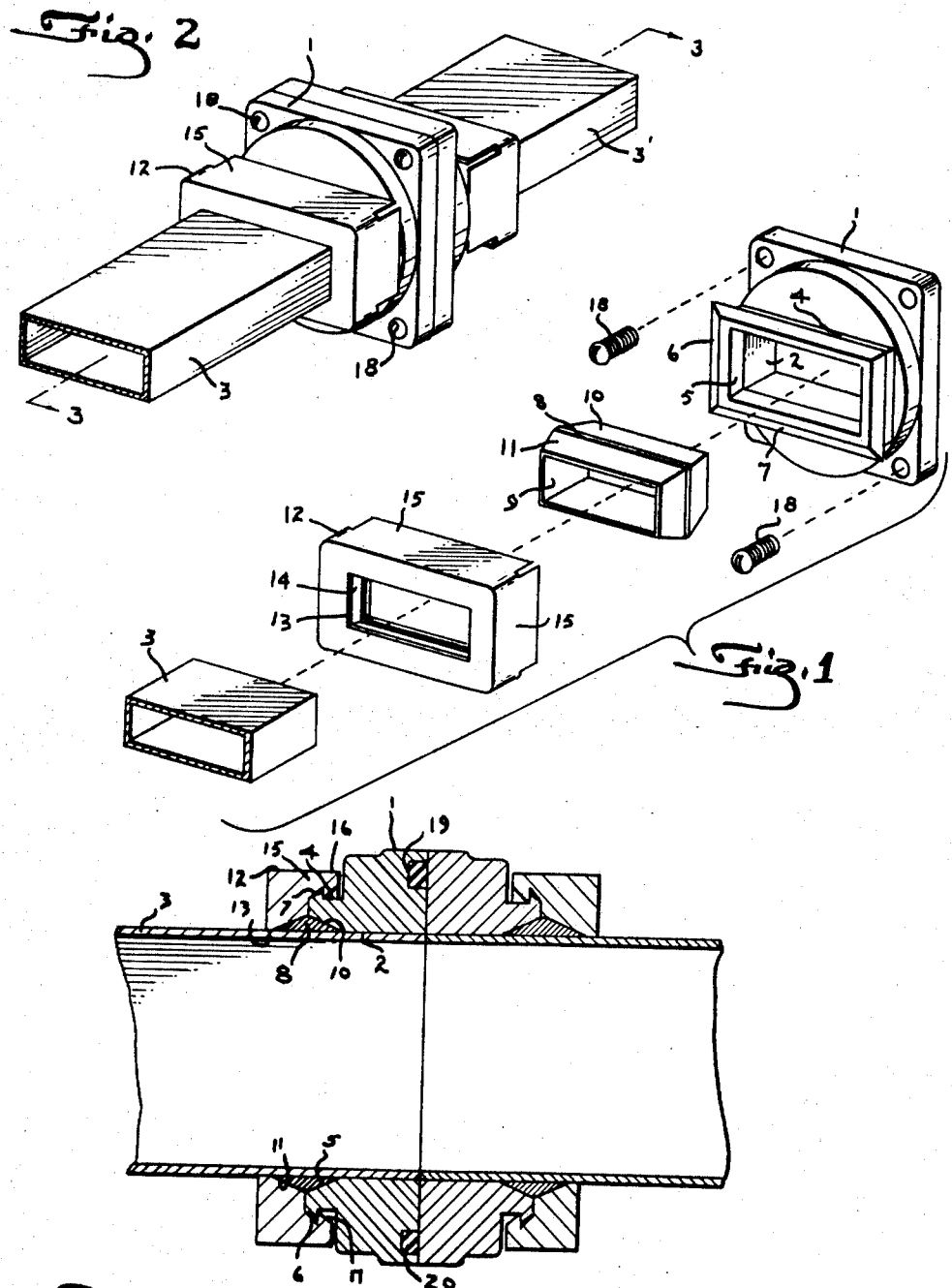

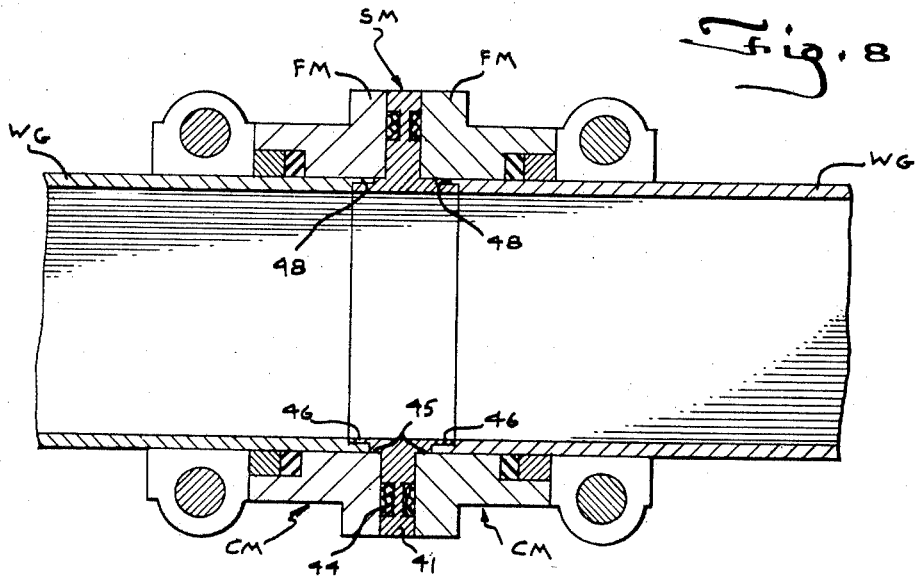
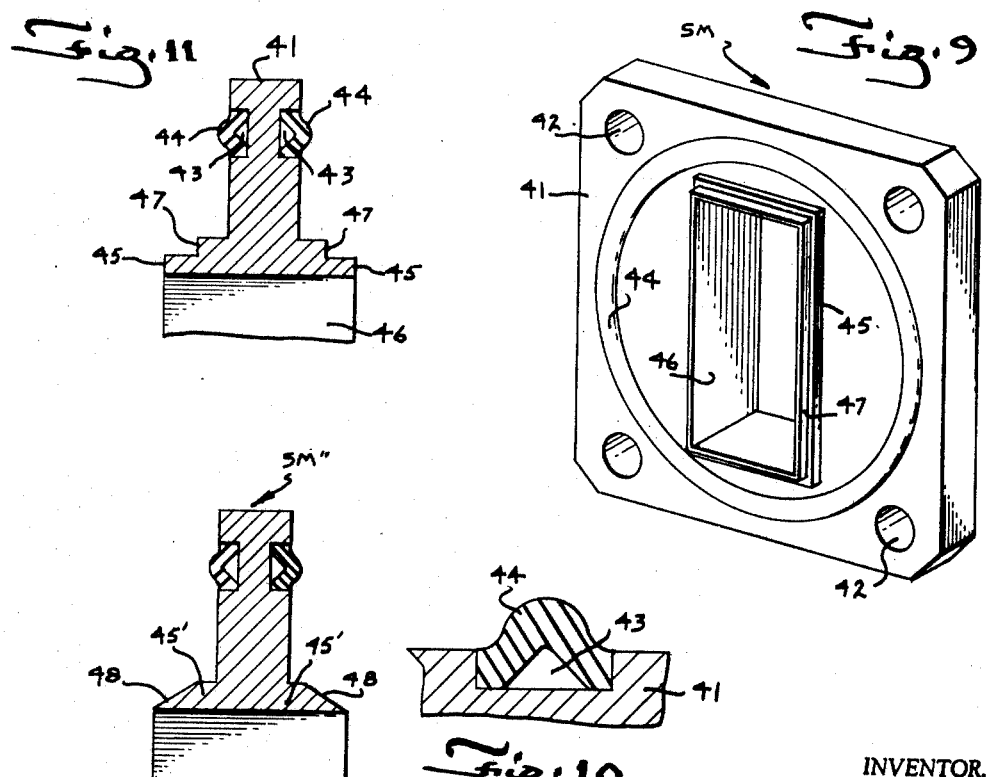

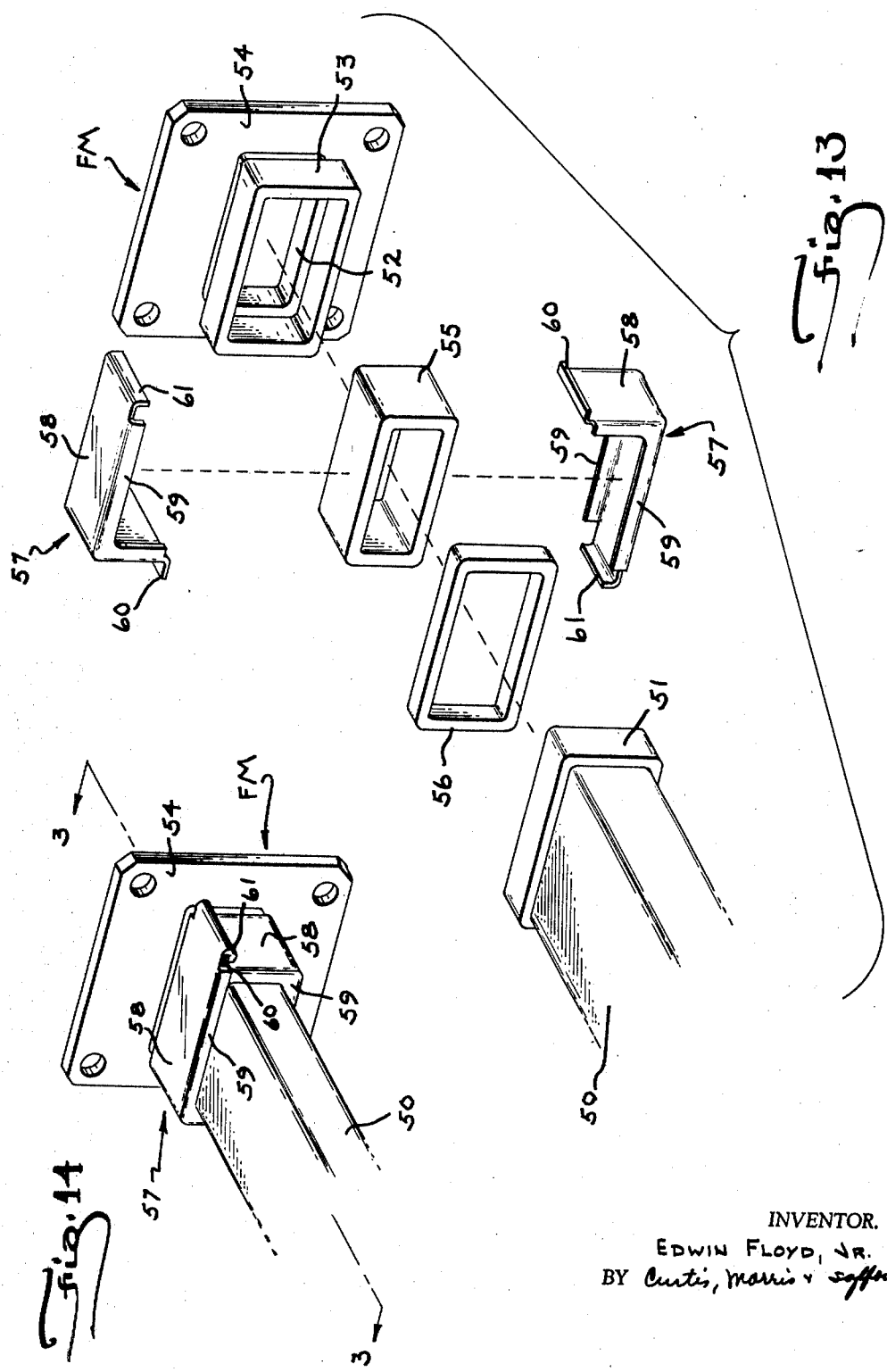

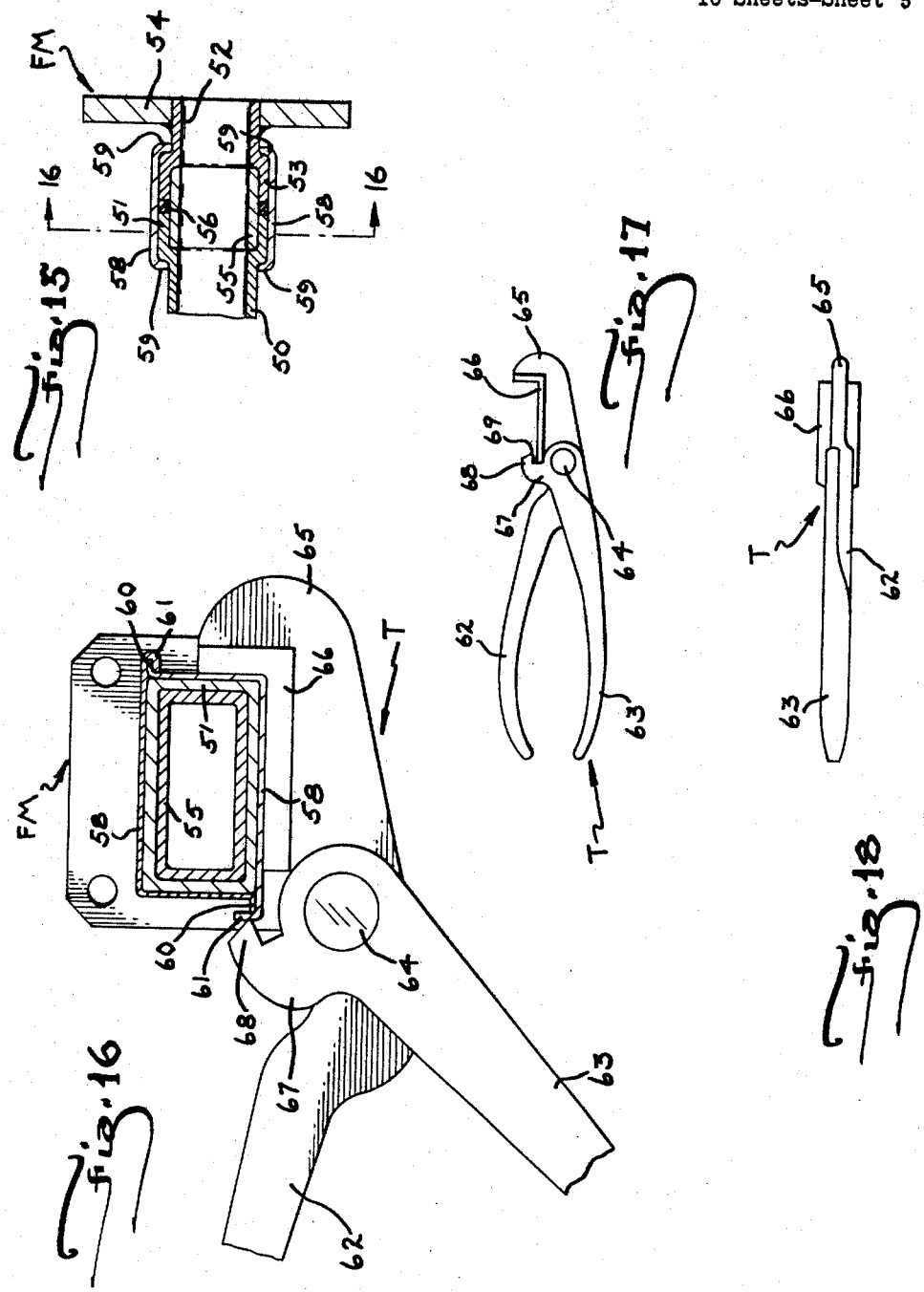

INVENTOR.
EDWIN FLOYD, JR.
BY Curtis, Morris & Safford

March 10, 1970  E. FLOYD, JR  3,500,264
CONNECTION MEANS FOR WAVEGUIDE MEANS
Filed Nov. 8, 1966  10 Sheets-Sheet 7
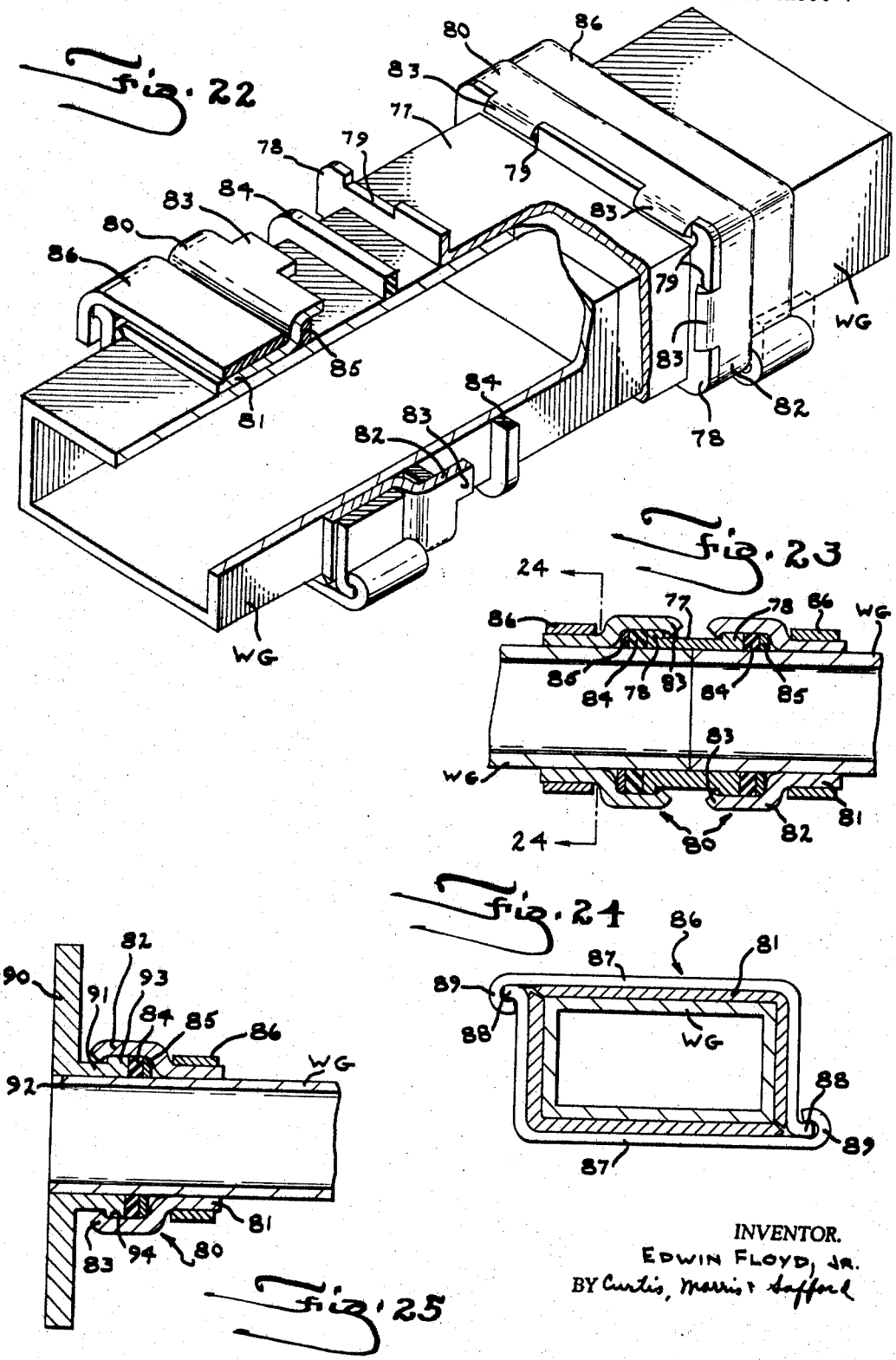
INVENTOR.
EDWIN FLOYD, JR.
BY Curtis, Morris & Safford

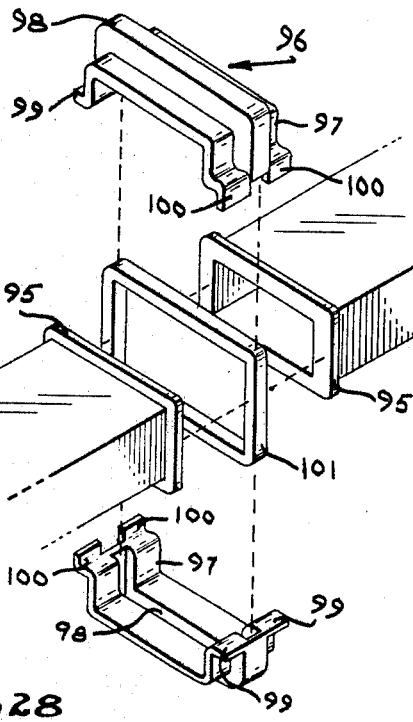
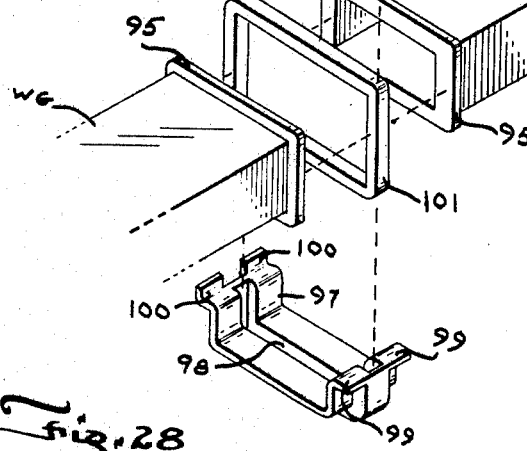
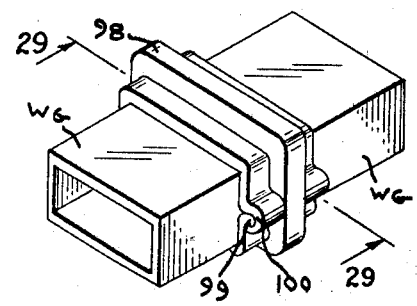
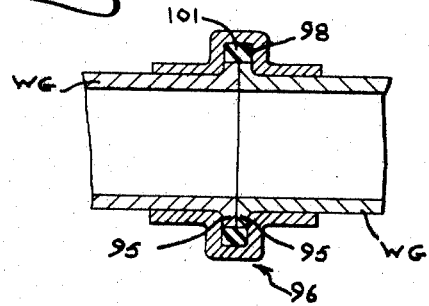
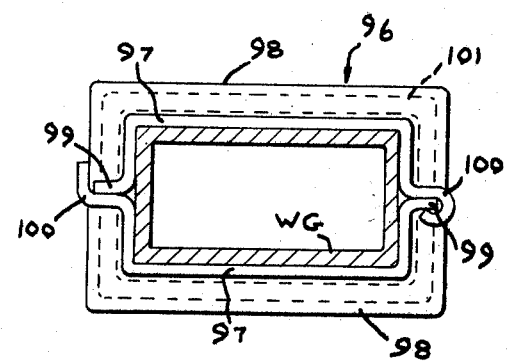
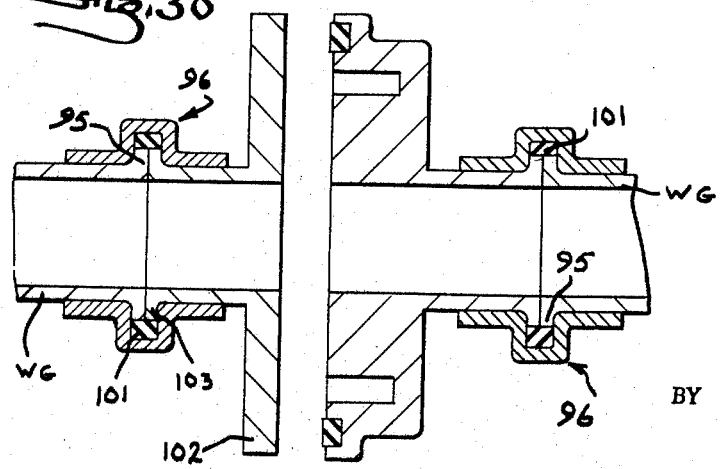
INVENTOR.
EDWIN FLOYD, JR.

United States Patent Office 3,500,264
Patented Mar. 10, 1970

3,500,264
CONNECTION MEANS FOR WAVEGUIDE MEANS
Edwin Floyd, Jr., Lower Paxton Township, Harrisburg, Pa., assignor to AMP Incorporated, Harrisburg, Pa.
Continuation-in-part of application Ser. No. 429,722, Feb. 2, 1965. This application Nov. 8, 1966, Ser. No. 592,767
Int. Cl. H01p 1/04
U.S. Cl. 333—98        23 Claims

ABSTRACT OF THE DISCLOSURE

The invention relates to means for connecting together sections of tubular members, such as waveguides, without soldering, welding or brazing. Such connecting means includes clamp means which is disposed on the parts to be connected, such clamp having securing means therefor and holds the members in alignment.

---

This application is a continuation-in-part of U.S. Patent Applications Ser. No. 429,722, filed Feb. 2, 1965, Ser. No. 467,604, filed June 28, 1965, and Ser. No. 525,050, filed Feb. 4, 1966, all now abandoned.

This invention relates to connection means and particularly to connection means for sections of tubing, such as, waveguide means.

In order to apply a flange member to the end of a rectangular or circular waveguide, it is conventional practice to weld or solder a flange onto the end of the waveguide. The heat generated to effect the welding, brazing, or soldering of the flange onto the waveguide causes distortion of the inside dimensions of the waveguide and plating has to be effected over the welded joints so that continuity is established. This is undesirable, because the inside dimensions of the waveguide are critical and the plating of the welded joint adds an additional step which is costly.

It is, therefore, a primary object of the present invention to provide connection means for waveguide means which obviates the above-mentioned disadvantages.

Another object of the present invention is the provision of connection means that is crimped onto waveguide means.

A further object of the present invention is to provide a connection means on waveguide means that is removable therefrom.

An additional object of the present invention is to provide connection means for waveguide means that is adjustable along the waveguide means.

A still further object of the present invention is to provide connection means for waveguide means wherein an adjustable choke joint is provided therein.

Still an additional object of the present invention is to provide connection means for waveguide means which are secured thereon without the aid of welding.

Still another object of the present invention is the provision of seal means for disposition between connection means for waveguide means.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGURE 1 is a perspective exploded view of parts of a connection means for application to waveguide means;

FIGURE 2 is a perspective view of connection means on waveguide means interconnecting the waveguide means;

FIGURE 3 is a cross-sectional view taken along lines 3—3 of FIGURE 2;

FIGURE 4 is a perspective exploded view of an alternative embodiment of the invention;

FIGURE 5 is a perspective view of the connection means of FIGURE 4 on waveguide means and interconnecting same;

FIGURE 6 is a view taken along lines 6—6 of FIGURE 5;

FIGURE 7 is a fragmentary cross-sectional view of FIGURE 6 in which a choke joint is established in the connection means;

FIGURE 8 is a longitudinal cross-sectional view of connection means on waveguide means with seal means therebetween;

FIGURE 9 is a perspective view of the seal means;

FIGURE 10 is a partial cross-sectional view illustrating the gasket of the seal means;

FIGURE 11 is a partial cross-sectional view illustrating the stepped-sections of the seal means;

FIGURE 12 is a view similar to FIGURE 11 but illustrating an embodiment of the seal means;

FIGURE 13 is an exploded perspective view of a further embodiment of the invention;

FIGURE 14 is a view of FIGURE 13 in an assembled condition;

FIGURE 15 is a cross-sectional view of FIGURE 14;

FIGURE 16 is a view taken along FIGURE 15 and illustrating the use of a tool to secure the clamping members in position;

FIGURE 17 is a side elevational view of the tool;

FIGURE 18 is a bottom plan view of the tool;

FIGURE 22 is a perspective and partially sectioned view of an additional embodiment of the invention;

FIGURE 23 is a cross-sectional view of FIGURE 22;

FIGURE 24 is a view taken along lines 24—24 of FIGURE 23;

FIGURE 25 is a cross-sectional view of a waveguide flange secured to a waveguide in accordance with the teaching of FIGURES 22–24;

FIGURE 26 is a perspective exploded view of a still further embodiment of the invention;

FIGURE 27 is a perspective view of FIGURE 26 in an assembled condition;

FIGURE 28 is a longitudinal cross-sectional view of FIGURE 27;

FIGURE 29 is a view taken along line 29—29 of FIGURE 27;

FIGURE 30 is a cross-sectional view of a waveguide flange secured to a waveguide in accordance with the teaching of FIGURES 26–29;

Figure 19:
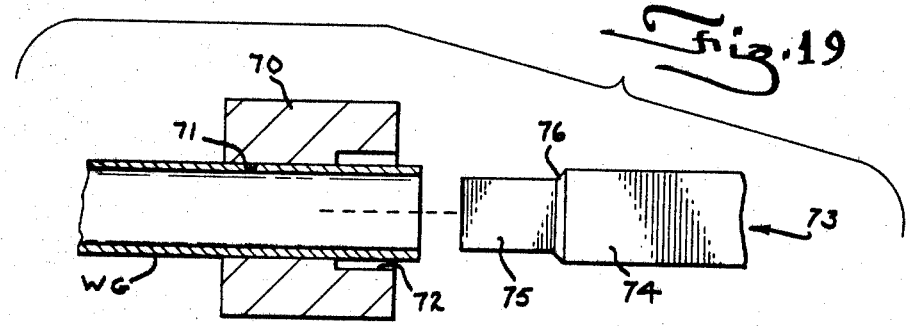
FIGURES 19 and 20 illustrate the manner in which ends of waveguides are expanded.

Turning now to the drawings and more particularly FIGURES 1–3, there is illustrated a flange member 1 having a rectangular opening 2 extending therethrough for receiving a rectangular waveguide 3 therein. A rectangular flange 4 extends outwardly from the back of flange member 1 and surrounds opening 2. A beveled surface 5 is located on the inside of flange 4 and is in communication with opening 2. A lip 6 extends outwardly from the sides of rectangular flange 4 and has a beveled surface 7 thereon.

A rectangular ferrule member 8 has an inner surface 9 of rectangular configuration so that waveguide 3 can pass therethrough. The exterior surface of ferrule member 8 is convex defining inclined surfaces 10 and 11. Ferrule member 8 is made from a dead-soft material, such as, for example, dead-soft brass, which is fully annealed. A locking member 12 has an opening 13 extending therethrough which conforms to the configuration of waveguide 3. A beveled surface 14 is located inwardly of opening 13 and in communication therewith. Segments 15 are located on locking member 12 and extend outwardly from each side thereof parallel to the sides of opening 13. Each of segments 15 has an inwardly-directed lip member 16, and each lip member 16 has a beveled surface 17 thereon. Flange member 1 and locking member 12 are made of a suitable material, such as, for example, brass, aluminum or alloy thereof; however, other suitable materials may, of course, be utilized.

In assembly, flange member 1 is inserted onto a mandrel (not shown) against a stop thereof. The mandrel is of the same size as the interior surface of the waveguide. Locking member 12 and ferrule member 8 are inserted onto waveguide 3, and waveguide 3 along with locking member 12 and ferrule member 8 are inserted on the mandrel; the waveguide passing into opening 2 and abutting against the stop on the mandrel so that the end of the waveguide is disposed in the same plane as the front flat surface of flange member 1. Ferrule member 8 is moved along waveguide 3 until inclined surface 10 is brought into engagement with beveled surface 5 of flange member 1, then locking member 12 is moved along waveguide 3 until lip members 16 thereof abut against lip 6 of flange member 1. Pressure is applied to locking member 12 by means of a suitable tool until lip members 16 are disposed in locking engagement with lip 6, as illustrated in FIGURE 3, thereby locking flange member 1 and locking member 12 together. Beveled surfaces 7 and 17 facilitate the outward movement of segments 15 so that lip members 16 can be brought into locking engagement with lip 6.

Upon the application of locking member 12 onto flange member 1, beveled surface 14 of locking member 12 engages inclined surface 11 of ferrule member 8, and the pressure of applying locking member 12 to flange member 1 and the action of beveled surfaces 5 and 14 onto inclined surfaces 10 and 11 of ferrule member 8 causes the ferrule member to tightly engage waveguide 3 due to its malleable characteristic. The assembly of the waveguide and connection means comprising flange member 1, ferrule member 8 and locking member 12, is removed from the mandrel, and the same operation is performed on another waveguide 3' to apply a connection means of the same kind described hereinabove thereto, as illustrated in FIGURES 2 and 3.

After the connection means have been applied to respective waveguide 3 and 3', the flange members of the connection means are interconnected by suitable means, such as, screws 18 to interconnect the waveguides, as illustrated in FIGURES 2 and 3. Once the flange members are secured together, the waveguides are brought into abutting relationship and in axial alignment.

A recess 19 is disposed in the front surface of one of the flange members to receive a gasket 20, thus effecting a seal between the surfaces of the two flange members when pressure is applied thereto. If the waveguide is not to be operated in a pressurized environment, recess 19 and gasket 20 can be eliminated. If desired, a quick-release coupling, such as disclosed in U.S. Patent Nos. 2,774,616, 2,788,498 and 2,862,728, may be utilized to provide a quick-release coupling for the connection means.

Turning now to FIGURES 5–7, there is illustrated an embodiment of the connection means for waveguide means. In this embodiment, flange member 21 has an opening 22 therein for receiving waveguide 23 therein. An extension 24 extends outwardly from the rear surface of flange member 21 and has an opening 25 disposed therein in communication with opening 22. Opening 25 is larger than opening 22 and is delimited therefrom by means of surface 26. Projections 27 extend outwardly from extension 24 and flange member 21 and each projection 27 has a threaded hole 28 disposed therein. A gasket 29 is adapted to be disposed in opening 25 against surface 26.

A clamping member 30 has an opening 31 extending therethrough which conforms to the configuration of waveguide 23. A flange 32 is located on clamping member 30 and is adapted to be disposed within opening 25 against a gasket 29, as illustrated in FIGURE 6. A slot 33 is disposed in each side of clamping member 30, and a hole 34 is located also in each side of clamping member 30. Hole 34, below slot 33, is threaded so as to receive screw member 35 so that when clamping member 30 is placed onto waveguide 23, it can be clamped tightly in place thereon by screwing screw members 35 into the threaded sections of holes 34, thereby decreasing the width of slot 33. Recesses 36 are disposed adjacent the entrance to holes 34 in order to receive the heads of screw members 35.

Projections 37 extend outwardly from clamping member 30, and they have the same configuration as projections 27 on flange member 21. A hole 38 is disposed in each of projections 37 and is in alignment with the respective hole 28 of projections 27, so that screw members 39 extend through holes 38 and engage threaded holes 28 in order to secure clamping member 30 onto flange member 21 and to cause flange 32 to abut against gasket 29 in a sealing manner.

In assembly, clamping member 30, with screw members 35 in a loose manner, is placed on waveguide 23, gasket 29 is then placed on the waveguide and flange member 21 is also placed thereon. Screw members 39 are then passed through holes 38 into engagement with threaded holes 28 and these screws are tightened to secure clamping member 30 onto flange member 21 so that flange 32 abuts tightly against gasket 29 to seal the waveguide with respect to the connection means. The end of waveguide 23 is brought into alignment with the front flat surface of flange member 21 and screw members 35 are tightened until clamping member 30 securely engages waveguide 23 to secure the connection means onto the waveguide. This procedure is repeated to apply a similar connection means onto waveguide 23', and, after this procedure has been completed, the flange members of the connection means are brought into abutting relationship, as illustrated in FIGURE 6, and secured together by means of screw members 40. A quick-release coupling of the type disclosed in the above-mentioned patents may, of course, be utilized in place of screw members 40 to secure the flange members of the connection means together.

Since the waveguides can be spaced with respect to one another within one of the connection means, as illustrated in FIGURE 7, or at the interfaces of the flange members, the effect of a built-in choke is obtained, thereby reducing RF leakage to a minimum. The space relationship of the waveguide in the connector means establishes the choke operation.

While the present invention is directed to securing connector means onto respective waveguides in order to interconnect same, a connector means of the present invention can be secured onto a waveguide and the connector means can be secured to an existing connector means secured on another waveguide. A gasket (not shown) can be disposed between the abutting surfaces of the flange members in order to provide a seal therefor if the waveguide is to be utilized in a pressurized system. While rectangular waveguides have been illustrated, waveguides of other configurations may be used, and the openings in the parts of the connector means to receive the waveguides will, of course, have the same configuration as that of the waveguides. If the front flat surfaces of the flange member has to be plated, this can be done prior to being assembled onto the waveguide.

FIGURES 8–11 illustrate an embodiment of the invention comprising a seal means SM which is interposed between flange members FM of connection members CM of the type illustrated in FIGURES 5–7 secured onto waveguide members WG. Seal means SM comprises a section 41 mateable with flange members FM including holes 42 to secure the flange members and seal means together via screws (not shown).

Annular recesses 43 are disposed in each surface of section 41, and a gasket member 44, which is made of a suitable sealing material, is disposed in each recess 43. As can be discerned, gasket members 44 have their ends engaged against the sides of recesses 43, and U-shaped portions extend outwardly from the surfaces of section 41. V-shaped portions face the bottom surfaces of recesses 43. Thus, when the seal means is interposed between flange members, the U-shaped portions of the gasket members sealingly engage the flange members. The V-shaped portions allow room for the gasket members to effect an excellent seal when the flange members and seal means are drawn tightly together, because, even if the V-shaped portions could be bottomed in recesses 43, a sufficient amount of the U-shaped portions would still extend above the surfaces of section 41 to provide an excellent seal.

Flange sections 45 extend outwardly from section 41 in a direction normal thereto, and the inner surfaces are in alignment with the inner surface of section 41 so that these inner surfaces delimit an opening 46 which corresponds to the cross-sectional configuration of waveguide members WG. Stepped portions 47 are disposed in flange sections 45, and these stepped portions mate with stepped portions 48 in the ends of waveguide members WG so that the ends of the waveguide members are held in strict alignment in order to assure the proper operational characteristics of the waveguide through the jointure of the waveguide members. Thus, the stepped portions of the flange sections in engagement with the ends of the waveguide members bias the ends of the waveguide members against the inside surfaces of the connection members.

FIGURE 12 is an alternative embodiment of seal means SM' wherein flange sections 45' have beveled surfaces 48 which are mateable with similar beveled surfaces (not shown) on the ends of the waveguides members in order to assure the proper alignment of the waveguide members and to bias the ends of the waveguide members against the inside surfaces of the connection members in the same manner as that of FIGURES 8–11. Of course, the ends of the flange sections of the seal means and the waveguide members may take any desirable configuration so long as proper operation thereof is obtained.

The seal means of the present inventions performs the function of sealing a joint between connection means of waveguide members as well as providing proper alignment therefor.

As can be discerned, there has been disclosed a unique connector means to be secured onto waveguide means in order to interconnect waveguide means as well as seal means for disposition therebetween.

Turning now to FIGURES 13 through 16, there is illustrated a further embodiment of the invention. Waveguide 50 has end 51 expanded or flared. Flange member FM has a first section 52 corresponding to the cross-sectional configuration of waveguide 50 and a second section 53 which is expanded or flared and has a cross-sectional configuration corresponding to that of expanded end 51. Flange member FM is fabricated with sections 52 and 53 being brazed to a conventional flange 54 or flange member FM is formed in accordance with conventional casting techniques to include flange 54 and sections 52 and 53 as a unitary member. A sleeve 55 is insertable within expanded end 51 of waveguide 50 and expanded section 53 of the flange member and is preferably a piece of waveguide. A gasket made of a suitable material such as, for example, rubber, plastic or the like has a cross-sectional configuration corresponding to that of expanded end 51 and expanded section 53. Clamping members 57 includes identical elements 58 each defining an L-shaped cross-sectional configuration and having inwardly-directed sections 59 along the sides to define a channel. The short leg of each L-shaped element 58 terminates into an outwardly-directed lug 60 while the long leg of each of L-shaped element 58 terminates into an inwardly-directed lug 61.

In assembly, gasket 56 is positioned on the exterior surface of sleeve 55 about midway thereof and sleeve 55 is disposed within expanded end 51 of waveguide 50 and expanded section 53 of flange member FM. The length of sleeve 55 is such that it can fit within expanded end 51 and expanded section 53 and permit the opposed surfaces of expanded end 51 and expanded section 53 to engage gasket 56. Flange member FM and waveguide 50 are pushed toward each other so that the opposing surfaces of expanded end 51 and expanded section 53 are brought into tight and sealing engagement with gasket 56 and then clamping member 57 is placed onto expanded end 51 and expanded section 53 with outwardly directed lugs 60 being disposed opposite inwardly-directed lugs 61 while inwardly-directed sections 59 engage the inner ends of expanded end 51 and expanded section 53. Inwardly-directed lugs 61 are then bent inwardly into engagement with respective outwardly-directed lugs 60 to secure the clamping member in position as illustrated in FIGURES 14 through 16 to complete the connection between wave guide 50 and flange member FM.

With clamping member 57 secured in position, inwardly-directed sections 59 maintain the opposing surfaces of expanded end 51 and expanded section 53 in tight engagement with gasket 56 and the inner surfaces of waveguide 50, section 52 and sleeve 55 define a smooth continuous surface having the same cross-sectional configuration throughout to maintain the transmission characteristics of the joint of the wave guide in this area substantially constant throughout. The spacing between sleeve 55 and abutting flange member FM and waveguide 50 is very small.

FIGURES 16 through 18 illustrate a tool T to clamp clamping member 57 in position on the joint between wave guide 50 and flange member FM. Tool T comprises handles 62 and 63 which are pivotally connected together by means of pivot pin 64. Handle 62 has a jaw 65 provided with an L-shaped nest area 66 including a long leg extending outwardly and away from pivot pin 64 and a short leg extending parallel to pivot pin 64. Handle 63 includes an extension 67 having a projection 68 disposed at right angles thereto. Inner edge 69 of projection 68 is sharp. Extension 67 extends outwardly from pivot pin 64 and slightly to the rear of the axis thereof. Extension 67 engages the long leg of nest area 66 to limit the movement of handles 62 and 63 toward one another, and, in this position as illustrated in FIGURE 17, the inner surface of projection 68 extends parallel to the long leg of nest area 66.

In operation, handles 62 and 63 are moved away from one another and the short leg and long leg of nest area 66 are brought into respective engagement with short and long legs of an element 58 of clamping member 57 in position on expanded end 51 and expanded section 53. Handle 63 is then moved toward handle 62 causing sharp edge 69 to engage the inwardly-directed lug 61 of element 58 and bending it into tight engagement with the outwardly-directed lug 60 of the other element 58. Tool T is operated in the same fashion to bend the other inwardly-directed lug 61 into tight engagement with the other outwardly-directed lug 60 thereby securing clamping member 57 in position over the joint between waveguide 50 and flange member FM.

Figure 20:
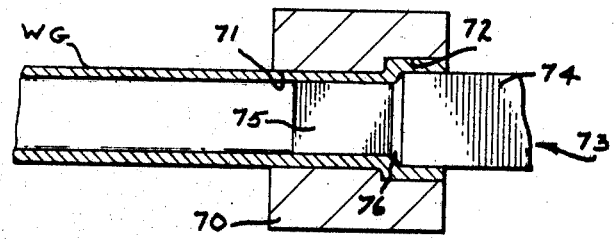

FIGURES 19 and 20 illustrate an apparatus and method for expanding or flaring the end of a waveguide WG. A die block 70 has an opening 71 extending therethrough corresponding to the cross-sectional configuration of waveguide WG. Opening 71 merges into an enlarged section 72 having the same cross-sectional configuration as opening 71. A mandrel 73 is disposed opposite opening 71 and is in alignment therewith. Mandrel 73 has a first section 74 which has a cross-sectional configuration corresponding to enlarged section 72 minus the thickness of waveguide WG and a second section 75 having a cross-sectional configuration corresponding to opening 71 minus the thickness of waveguide WG. A beveled section 76 is disposed between first and second sections 74 and 75. Die block 70 is preferably secured in position while mandrel 73 is movable relative thereto; however, the mandrel can be stationary while die block 70 is movable or both can be movable relative to each other.

In operation, waveguide WG is secured in opening 71 of die block 70 in any suitable manner and the end of the waveguide protrudes slightly from the end of die block 70 containing enlarged section 72. Mandrel 73 is moved into waveguide WG and causes the end of the waveguide to be expanded against the surfaces of enlarged section 72 to provide an expanded end of the waveguide. Die block 70 is preferably made in two pieces so that the expanded wave guide can be readily removed therefrom.

Figure 21:
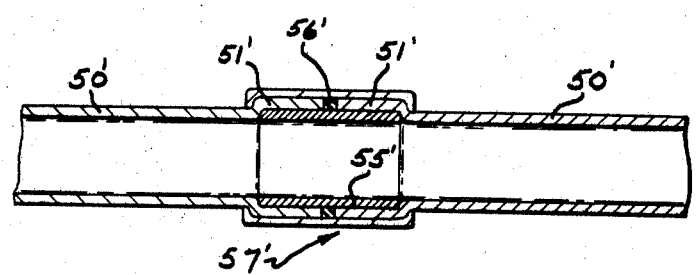
FIGURE 21 is a cross-sectional view illustrating splicing the ends of waveguides together.
Figure 31:
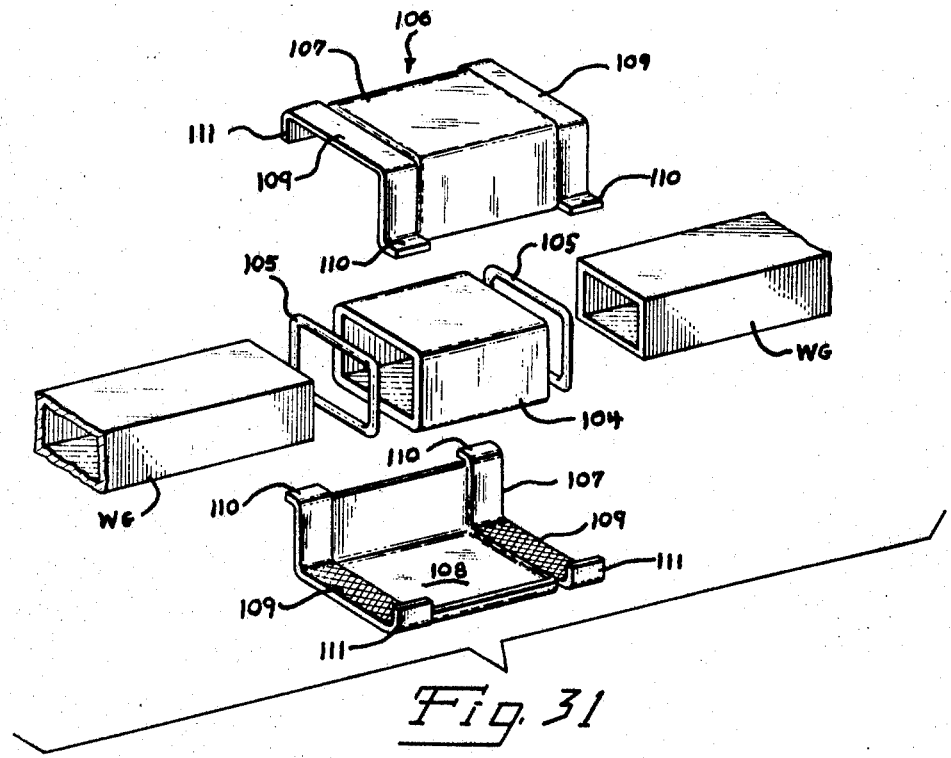
FIGURE 31 is an exploded and perspective view of still an additional embodiment of the invention.
Figure 32:
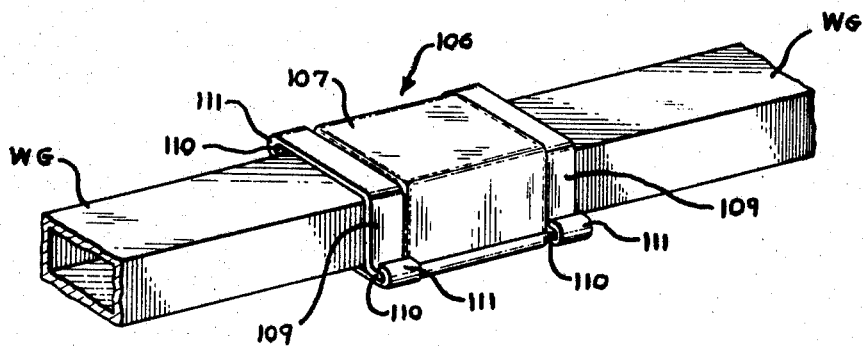
FIGURE 32 is a view similar to FIGURE 31 in an assembled condition.

FIGURE 21 illustrates splicing the ends of waveguides together wherein expanded ends 51' of waveguides 50' has sleeve 55' with gasket 56' thereon disposed therewithin and clamping member 57' is clamped in position over the joint to secure the expanded ends together to effect a splice absent flange members.

FIGURES 22 through 24 illustrate an additional embodiment of the invention. This embodiment comprises a tubular coupling sleeve 77 having flanges 78 at each end thereof. Recesses 79 are disposed at spaced locations in each of flanges 78. Clinching members 80 include a first section 81 and a second section 82. The first section 81 is longitudinally split along at least one end but can be longitudinally split at opposing ends as illustrated in FIGURE 24. Second section 82 is expanded and includes tabs 83 extending outwardly therefrom in alignment with respective recesses 79. Sealing members 84 of rubber, plastic or the like and metallic members 85 are disposable between respective flanges 78 and clinching members 80.

Clamping members 86 are similar to clamping member 57 of FIGURE 13 except that clamping members 86 do not have any inwardly-directed sections along the sides. Each clamping member 86 includes elements 87 each defining an L-shaped configuration. The short leg of each element 87 terminates in an outwardly-directed lug 88 and the long leg of each of elements 87 terminates as an inwardly-directed lug 89. Inwardly-directed lugs 89 are bendable into engagement with outwardly-directed lugs 88 with tool T of FIGURES 16 through 18.

In assembly, clinching members 80, metallic members 85 and sealing members 84 are placed on the ends of waveguides WG. The ends of the waveguide are disposed in abutting relationship centrally of tubular coupling sleeve 77 and they are held in this position. One of clamping members 86 secured on a first section 81 of one of clinching members 80 causing split section 81 to tightly engage and be secured on its respective waveguide WG. Tabs 83 of the clinching member are bent inwardly within respective recesses 79 securing this clinching member and tubular coupling sleeve together and causing metallic member 85 to press sealing member 84 against flange 78 to effect a seal therebetween. The other waveguide WG being held firmly against the coupled waveguide, the other clinching member is moved into engagement with flange 78 so that tabs 83 thereof are bent inwardly within respective recesses 79 to secure this clinching member to coupling sleeve 77 and causing metallic member 85 to press sealing member 84 in sealing engagement with flange 78. The other clamping member 86 is secured on respective section 81 thereby causing this split section to be secured on its respective waveguide.

FIGURE 25 illustrates a waveguide flange 90 secured to waveguide WG in accordance with the teaching of FIGURES 22 through 24. Waveguide flange 90 has an extension 91 surrounding opening 92 in which waveguide WG is disposed. Extension 91 terminates in a flange 93 having recesses 94 disposed therein to receive tabs 83 of clinching member 80. Clamping member 86 is secured on split section 81 of clinching member 80 to secure the clinching member on the waveguide and metallic member 85 pushes sealing member 84 into sealing engagement with flange 93. Waveguide flange 90 can be fabricated by flaring extension 91 to form flange 93. Waveguide flange 90 can also be cast or made in any other suitable manner.

FIGURES 26 through 30 illustrate a still further embodiment of the invention. Turning now to FIGURES 26 through 29, the ends of waveguides WG are provided with a flange 95 which is formed in accordance with conventional flaring techniques or a metallic member can be brazed into position on the ends of the waveguides to form the flange. A clamping member 96 is similar to clamping member 57 and includes elements 97 each having a U-shaped configuration and provided with a central channel 98. One leg of each element 97 terminates in outwardly-directed lugs 99 on each side of channel 98 and the other leg terminates in L-shaped lugs 100 on each side of channel 98. A sealing gasket 101 of rubber, silicone or plastic material having conductive particles therein is mountable around flanges 95 and is disposable within channels 98 of clamping member 96.

In assembly, sealing gasket 101 is disposed on one of the waveguides, flanges 95 of the waveguides are placed against each other and held in this position, gasket 101 is disposed on the abutting flanges and elements 97 of clamping member 96 are disposed on flanges 95 and gasket 101. A tool similar to tool T of FIGURES 16 through 18 is used to bend lugs 100 into engagement with lugs 99 thereby securing clamping member 96 in position on the waveguide joint and maintaining flanges 95 in tight engagement with each other so that the inner surfaces of the wave guides are in alignment; gasket 101 provides an effective seal for the joint. This tool would have to be provided with a recess in the nest area to receive channels 98 and the projection would have to be bifurcated. Metallic foil (not shown) may be disposed on flanges 95 and gasket 101 prior to securing clamping member 96 thereon to minimize RF leakage, define a shield and more effectively seal the joint.

FIGURE 30 illustrates a waveguide flange 102 similar in configuration to that of waveguide flange 90 in FIGURE 25 except that flange 103 is not provided with any recesses therein. Flange 95 of waveguide WG is disposed and held against flange 103 of waveguide flange 102 and clamping member 96 secures the waveguide and waveguide flange together in like manner as that of FIGURES 26 through 29 with sealing gasket 101 disposed in sealing engagement with the peripheries of the engaged flanges.

FIGURES 31 through 36 illustrate still an additional embodiment of the invention. This embodiment comprises a tubular sleeve 104 in which the ends of waveguides WG are disposed and gaskets 105 are located at each end of tubular sleeve 104. Clamping member 106 includes identical elements 107 with each element defining an L-shaped cross-sectional configuration and having a channel 108 in which tubular sleeve 104 is disposed. Clamping sections 109 delimit each end of channel 108. The short legs of clamping sections 109 terminate into outwardly-directed lugs 110 while the long legs of clamping sections 109 terminate into inwardly-directed lugs 111. The long legs of clamping sections 109 are knurled on their inner surfaces.

In assembly, gaskets 105 are positioned on the ends of waveguides WG and equal lengths of the ends of the waveguides are disposed within tubular sleeve 104. Elements 107 are then placed on the tubular sleeve and waveguides with tubular sleeve 104 being positioned within channels 108 of elements 107. Inwardly-directed lugs 111 are then bent inwardly into engagement with respective outwardly-directed lugs 110 by means of tool T of FIGURES 16 through 18 to secure the clamping member in position as illustrated in FIGURES 32 through 36. With clamping member 106 secured in position, clamping sections 109 coupled with the serrated surfaces thereof maintain the ends of the waveguides in tight engagement to maintain the transmission characteristics of the joint of the waveguide in this area substantially constant throughout. Gaskets 105 are preferred to provide a sealed joint.

Figure 33:
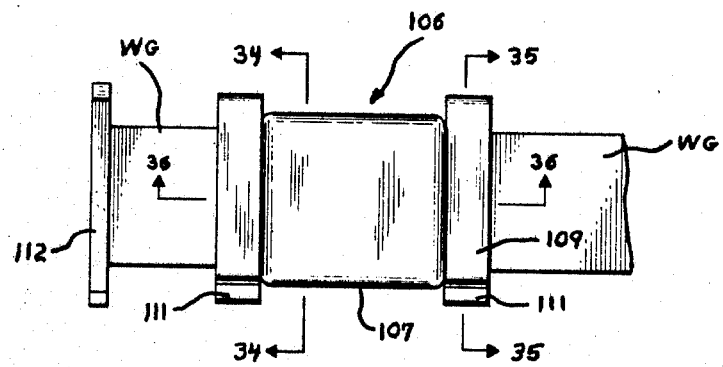
FIGURE 33 is a top plan view of FIGURE 32.
Figure 34:
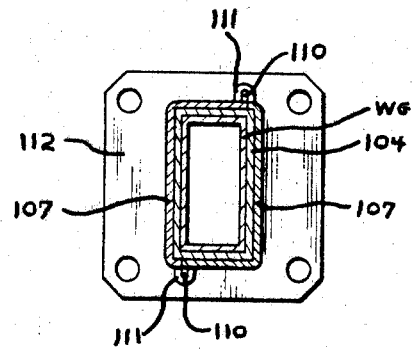
FIGURE 34 is a view taken along lines 34—34 of FIGURE 33.
Figure 35:
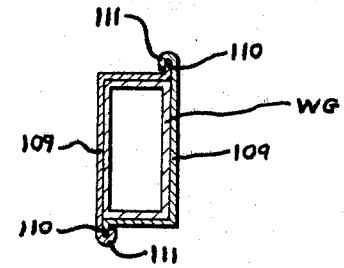
FIGURE 35 is a view taken along lines 35—35 of FIGURE 33.
Figure 36:
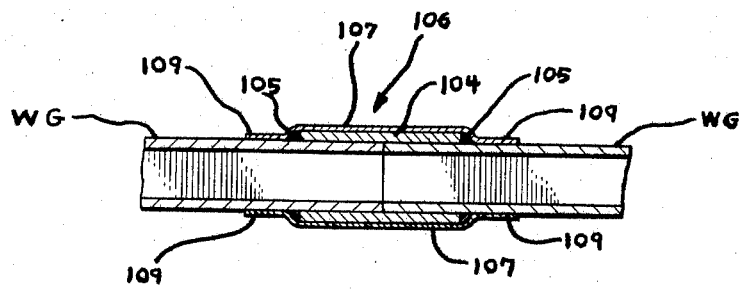
FIGURE 36 is a view taken along lines 36—36 of FIGURE 33.

The connection member of FIGURES 31 through 36 is similar to the connection member of FIGURES 13 through 21 except that in the embodiment of FIGURES 31 through 36, no expansion or operation on the waveguide is necessary except to provide knurling or the like on the waveguides in the area of the serrated surfaces on clamping section 109, if desired. As illustrated in FIGURES 33, 34 and 36 the connection member of FIGURES 31 through 36 can be utilized to connect an end of waveguide to an end of a piece of waveguide having a flange 112 thereon or to splice ends of waveguides together.

As can be discerned from the foregoing, there has been disclosed a unique connector means for inter-connecting waveguide means in proper alignment.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. Connection means for waveguide means comprising flange member means for disposition on said waveguide means and capable of lengthwise sliding movement thereon, lip means extending outwardly from said flange member means, malleable ferrule means disposable on said waveguide means, and locking means disposable on said waveguide means, and locking means disposable on said waveguide means capable of lengthwise sliding movement thereon, said locking means having yieldable locking segments provided with lip members for cooperable locking engagement with said lip means, said locking means upon being locked onto said lip means by relative lengthwise movement being adapted to bear against said ferrule means for causing it to tightly engage said waveguide means and secure said flange member means and said locking means on said waveguide means.

2. A coupling device for a pair of longitudinally extending members comprising mateable flange means constructed and arranged to be disposed respectively at the ends of said members and capable of lengthwise sliding movement thereon, locking means for disposition on respective members capable of lengthwise slidable movement thereon, malleable ferrule means for disposition on respective members between said flange means and said locking means, cooperable lip means on said locking means and flange means to secure same together by relative lengthwise movement thereof to cause said ferrule means to tightly engage respective members to secure said flange means thereon, and means for securing said flange means together so that said members are in alignment.

3. In a connection means for disposition on waveguide means, locking means having an opening through which said waveguide means is slidable, segments extending outwardly from said locking means, flange means having an aperture for receiving said waveguide means, malleable ferrule means adapted to be disposed on said waveguide means between the locking and flange means and cooperable lip means on said flange means and said segments to lock said flange means and segments together upon lengthwise movement of the locking means and to bear against said ferrule means to tightly engage said waveguide means thereby securing said flange means and locking means in position on said waveguide means.

4. In a connection means according to claim 3 wherein said locking means and flange means include beveled surfaces adjacent said openings thereof, said ferrule means includes inclined surfaces mateable with said beveled surfaces upon said locking means and flange means being locked together.

5. Connection means for a pair of waveguide sections each having flared end means for coupling said sections together, said connection means comprising clamp means having a channel for receiving both said flared end means and for holding them tightly coupled together and to maintain said waveguide sections in alignment, and means on said clamp means for compressing said clamp means inwardly toward said waveguide sections.

6. Connection means according to claim 5 wherein sleeve means is disposed within said flared end means.

7. Connection means according to claim 5 wherein gasket means is disposed between said flared end means and said clamp means to provide a sealed joint.

8. Connection means according to claim 5 wherein said clamp means includes channel means in which said flared end means is disposed.

9. For use on longitudinally extending tubular means having flanged end means to form a connection joint, gasket meas disposable around abutted flanged end means, clamping means engageable on said tubular means, channel means on said clamping means for receiving said gasket means and said flanged end means therein to maintain said flanged end means in engagement, and securing means on said clamping means to secure said clamping means onto said tubular means including stationary members and bendable members bendable into engagement with said stationary members.

10. For use on tubular means according to claim 9 wherein said clamping means includes identical elements.

11. For use on longitudinally extending tubular means having flared end means to form a connection joint, sleeve means disposable within said flared end means, gasket means for disposition on said sleeve means and between opposing surfaces of said flared end means, clamping means engageable on said tubular means, channel means on said clamping means for receiving said gasket means and flared end means therein to maintain said flared end means in engagement, and securing means on said clamping means to secure said clamping means onto said tubular means.

12. For use on tubular means according to claim 11 wherein said clamping means includes identical elements.

13. For use on tubular means according to claim 11 wherein said securing means includes stationary members and bendable members bendable into engagement with said stationary members.

14. Connection means for waveguide means comprising means for receiving said waveguide means thereinto, flange means on said receiving means, unitary means having a first section for engaging said waveguide means and a second section securable onto said flange means and clamping means clampable onto the outer surface of said first section to secure said sectioned means on said waveguide means.

15. Connection means according to claim 14 wherein gasket means is disposed between said engaging means and said flange means.

16. Connection means according to claim 14 wherein said flange means includes spaced recesses and said second section includes tabs bendable within said recesses.

17. Four use on longitudinally extending tubular members, tubular coupling sleeve means for receiving ends of said tubular members, flange means on each end of said sleeve means and including spaced recesses, clinching means for disposition on respective tubular members including first sections having tabs bendable within respective recesses of said flange means and second sections engageable with said tubular members, and clamping means clampable on said second sections to secure same onto said tubular members.

18. Connection means for waveguide means comprising tubular means for receiving said waveguide means thereinto, clamping means for disposition onto said tubular means and said waveguide means, and means on said clamping means for securing said clamping means onto said tubular means and said waveguide means including outwardly-directed lug means and inwardly-directed lug means bendable into engagement with said outwardly directed lug means.

19. Connection means according to claim 18 wherein said clamping means includes channel means in which said tubular means is to be disposed.

20. Connection means according to claim 18 wherein said clamping means includes serrated surface means engageable with said waveguide means.

21. For use on longitudinally extending tubular members, tubular sleeve means for receiving ends of said tubular members, clamping means having first section means engageable with said tubular sleeve means and second section means engageable with said tubular members adjacent said tubular sleeve means, and means on said second section means for securing said clamping means on said tubular sleeve means and said tubular members thereby connecting said tubular members together, said means on said second section means including inwardly-directed lug means bendable into engagement with outwardly directed lug means.

22. For use on longitudinally extending tubular members according to claim 21 wherein gasket means is disposed between said clamping means and said tubular members at the ends of said tubular sleeve means.

23. For use on longitudinally extending tubular members according to claim 21 wherein said clamping means includes channel means to receive said tubular sleeve means.

References Cited

UNITED STATES PATENTS

| | | | |
|---|---|---|---|
| 704,909 | 7/1902 | Nycum | 285—364 |
| 817,300 | 4/1906 | David | 285—364 |
| 1,956,683 | 5/1934 | Hewitt | 285—341 |
| 2,340,732 | 2/1944 | Bruno | 285—363 |
| 2,513,178 | 6/1950 | Jackson | 285—363 |
| 2,558,695 | 6/1951 | Unger | 285—363 |
| 2,606,967 | 8/1952 | Collard et al. | 333—98 |
| 2,900,200 | 8/1959 | Unstadter | 285—369 |
| 2,955,857 | 10/1960 | Smith | 333—98 |
| 3,051,514 | 8/1962 | Consolloy | 285—369 |
| 3,287,034 | 11/1966 | Bragg | 285—382 |
| 3,365,681 | 1/1968 | Floyd et al. | 333—98 |

FOREIGN PATENTS

| | | |
|---|---|---|
| 166,718 | 7/1921 | Great Birtain. |
| 398,682 | 9/1933 | Great Britain. |
| 940,009 | 10/1963 | Great Britain. |
| 516,989 | 2/1955 | Italy. |
| 725,144 | 3/1955 | Great Britain. |

OTHER REFERENCES

Southworth, G. C., Principles and Applications of Waveguide Transmission, D. Van Norstrand Co., Inc., N.Y., 1950, pp. 201, 202 relied on.

HERMAN KARL SAALBACH, Primary Examiner

L. ALLAHUT, Assistant Examiner

U.S. Cl. X.R.
285—363, 369